United States Patent
Flordelis et al.

(12)

(10) Patent No.: US 12,425,090 B2
(45) Date of Patent: Sep. 23, 2025

(54) METHODS FOR BEAM SUPPRESSION AT A WIRELESS DEVICE, RELATED NETWORK NODES AND RELATED WIRELESS DEVICES

(71) Applicant: Sony Group Corporation, Tokyo (JP)

(72) Inventors: Jose Flordelis, Lund (SE); Erik Bengtsson, Eslöv (SE); Kun Zhao, Malmö (SE); Olof Zander, Södra Sandby (SE); Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/030,042

(22) PCT Filed: Sep. 16, 2021

(86) PCT No.: PCT/EP2021/075433
§ 371 (c)(1),
(2) Date: Apr. 3, 2023

(87) PCT Pub. No.: WO2022/078700
PCT Pub. Date: Apr. 21, 2022

(65) Prior Publication Data
US 2023/0387999 A1 Nov. 30, 2023

(30) Foreign Application Priority Data
Oct. 16, 2020 (SE) .................. 2051207-5

(51) Int. Cl.
*H04B 7/06* (2006.01)
*H04B 7/08* (2006.01)
*H04L 25/02* (2006.01)

(52) U.S. Cl.
CPC ......... *H04B 7/06952* (2023.05); *H04B 7/088* (2013.01); *H04L 25/0224* (2013.01)

(58) Field of Classification Search
CPC .... H04B 7/0695; H04B 7/088; H04L 25/0224
See application file for complete search history.

(56) References Cited

U.S. PATENT DOCUMENTS

2010/0127931 A1* 5/2010 Rensburg ............... H04B 7/026
342/372
2013/0163544 A1 6/2013 Lee et al.
(Continued)

FOREIGN PATENT DOCUMENTS

CN 102742173 A 10/2012
CN 110603871 A 12/2019
(Continued)

OTHER PUBLICATIONS

International Search Report from corresponding International Application No. PCT/EP2021/075433, mailed on Jan. 4, 2022, 2 pages.
(Continued)

*Primary Examiner* — Dac V Ha
(74) *Attorney, Agent, or Firm* — Tucker Ellis LLP

(57) ABSTRACT

A method is disclosed, performed by a network node, for beam suppression at a wireless device. The wireless device is configured to communicate with the network node. The method comprises transmitting, to the wireless device, reference signals for channel estimation of a set of beams. The method comprises communicating, between the network node and the wireless device, control signaling indicative of beam suppression of at least one beam of a first subset of beams suppressible by the wireless device.

18 Claims, 11 Drawing Sheets

(56) References Cited

U.S. PATENT DOCUMENTS

| | | | |
|---|---|---|---|
| 2014/0050275 | A1 | 2/2014 | Kotecha et al. |
| 2019/0014570 | A1* | 1/2019 | Nam ................. H04B 7/0617 |
| 2019/0342057 | A1 | 11/2019 | Rico Alvarino et al. |
| 2020/0076648 | A1 | 3/2020 | Li et al. |
| 2020/0396621 | A1* | 12/2020 | Park ................. H04B 7/0695 |
| 2021/0266076 | A1* | 8/2021 | Chen ................. H04B 7/0871 |
| 2022/0216902 | A1* | 7/2022 | Faxér ................. H04B 7/0417 |
| 2023/0337020 | A1* | 10/2023 | Da Silva ............. H04W 24/04 |

FOREIGN PATENT DOCUMENTS

| | | |
|---|---|---|
| CN | 110741566 A | 1/2020 |
| EP | 3217569 A1 | 9/2017 |
| WO | WO-2016037639 A1 | 3/2016 |
| WO | WO-2017095467 A1 | 6/2017 |
| WO | WO-2018208216 A1 | 11/2018 |
| WO | WO-2020067945 A1 | 4/2020 |

OTHER PUBLICATIONS

Office Action and Search Report from corresponding Swedish Application No. 2051207-5, mailed on Jun. 3, 2021, 8 pages.
Salah Eddine Hajri et al., "Scheduling in Massive MIMO: User Clustering and Pilot Assignment," IEEE, Fifty-fourth Annual Allerton Conference, Sep. 27-30, 2016, 8 pages.

* cited by examiner

US 12,425,090 B2

1

METHODS FOR BEAM SUPPRESSION AT A WIRELESS DEVICE, RELATED NETWORK NODES AND RELATED WIRELESS DEVICES

The present disclosure pertains to the field of wireless communications. The present disclosure relates to methods for beam suppression at a wireless device, a related network node and a related wireless device.

BACKGROUND

Multi-user Massive Multiple Input Multiple Output, MIMO, type communications pose challenges in Frequency Division Duplex, FDD. With FDD, numerous channel state reports from wireless devices (such as user equipment, UE) may be triggered. This channel state reporting is inefficient and not desired.

SUMMARY

There is a need for reducing the number of CSI reports in FDD of 3$^{rd}$ Generation Partnership Project, 3GPP, system. Accordingly, there is a need for devices and methods for channel state reporting at a wireless device, which mitigate, alleviate or address the shortcomings. This disclosure therefore proposes methods for efficient beam suppression targeted at the irrelevant beams based on assistance from the network node which may be updated based on the interference observed from other wireless devices. This may result in an enhanced channel state reporting where reports may be reduced in number without compromising quality or with an acceptable quality reduction.

A method is disclosed, performed by a network node, for beam suppression at a wireless device. The wireless device is configured to communicate with the network node. The method comprises transmitting, to the wireless device, reference signals for channel estimation of a set of beams. The method comprises communicating, between the network node and the wireless device, control signaling indicative of beam suppression of at least one beam of a first subset of beams suppressible by the wireless device.

Further, a network node is provided, the network node comprising a memory circuitry, a processor circuitry, and a wireless interface, wherein the network node is configured to perform the method disclosed herein.

It is an advantage of the present disclosure that the disclosed network node is capable of aligning with the wireless device the beam suppression operations, such as enabling or disabling beam suppression, e.g. for one or more beams. A more efficient beam suppression targeted at the relevant beams may thus be provided, based on assistance from the network node, which may be updated e.g. based on interference observed from other wireless devices. The channel state reporting received by the network node may thus be improved. Furthermore, this provide an enhanced channel state reporting (such as Channel State Information CSI reporting) since the channel state reports may be reduced in number without compromising quality or with an acceptable quality reduction.

Further, a method is disclosed, performed by a wireless device, for beam suppression at the wireless device. The wireless device is configured to communicate with a network node. The method comprises receiving, from the network node, reference signals for channel estimation of a set of beams. The method comprises communicating, between the network node and the wireless device, control

2 signaling indicative of beam suppression of at least one beam of a first subset of beams suppressible by the wireless device.

Further, a wireless device is provided, the wireless device comprising a memory circuitry, a processor circuitry, and a wireless interface, wherein the wireless device is configured to perform the method disclosed herein.

It is an advantage of the present disclosure that the disclosed wireless device can benefit from a more efficient beam suppression targeted at the relevant beams, based on assistance from the network node, which may be updated for example based on a potential interference observed from other wireless devices (such as potential interference that can be expected without any mitigation applied). The wireless device may then provide an more efficient channel state reporting. Furthermore, this provides an enhanced channel state reporting since the channel state reports may be reduced in number without compromising quality or with an acceptable quality reduction.

The disclosure provides advantageously a network node-assisted beam suppression that allows to signal that in some occasions, beams are not to be suppressed (e.g., when interference from other wireless devices is not observed), which may increase the amount of energy captured from the desired signal.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1:
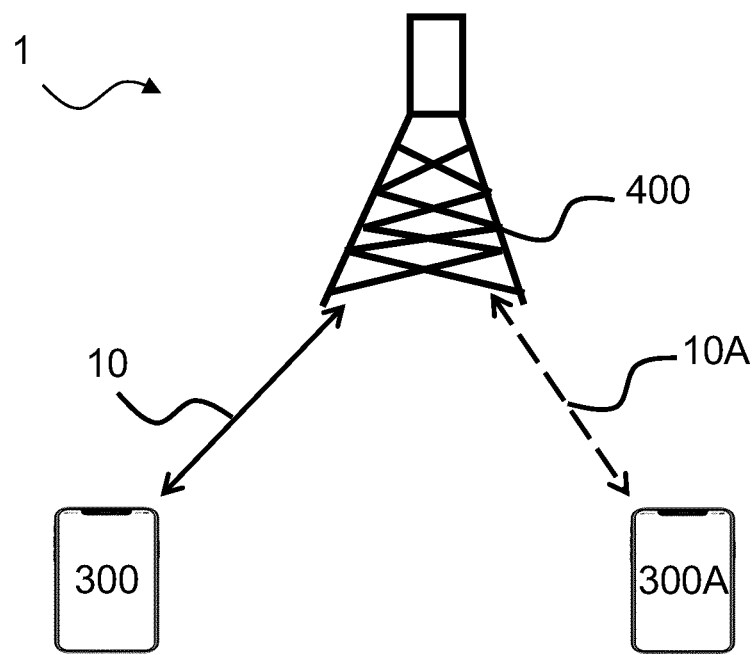
FIG. 1 is a diagram illustrating an example wireless communication system comprising an example network node and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

It may be appreciated to introduce the present disclosure with a system perspective. Let us assume a network node with P antenna ports, equipped with a codebook comprising N entries. For example, one entry can be considered as one beam (such as one spatial filter), and the P ports means that the network node can send P beams simultaneously. For simplicity, P may equal N. Let us assume K wireless devices, e.g. UEs, each wireless device has M antennas for simplicity, and that all wireless devices may be expected to be simultaneously served with rank one transmissions. It is clear to the person skilled in the art that the rank >1 transmissions may also be used. The rank transmission may be seen as the number of MIMO layers.

For example, during a Sounding Reference Signal (SRS) phase, the wireless devices transmit SRS signals in mutually orthogonal resources. For example, the network node listens with all P ports and uses different codebook entries for each port. For example, after the SRS phase, the network node has information about the subset of its codebook entries that can reach the wireless devices. For subsequent data transmissions, the network node can discard all codebook entries where no SRSs are received. For simplicity, P is redefined to denote the number of codebook entries relevant for data transmission.

For example, with FFD, since the SRSs are sent in the uplink, UL, band, the network node cannot rely on reciprocity to obtain the downlink, DL, channel complex gains. Wherefore, the network node transmits CSI-RS (where RS stands for reference signal) in the P codebook entries and requests the wireless devices to report the channel complex gains. In other words, in absence of noise, the P received DL CSI-RS at a given UE can be described mathematically by an M×1 vector, e.g.:

$$h_p = \begin{bmatrix} H_{1p} \\ H_{2p} \\ \vdots \\ H_{Mp} \end{bmatrix}$$

where $H_{mp}$ denotes the channel gain at the mth wireless device antenna for the pth CSI-RS. CSI feedback is not meant to feedback the entire vector $h_p$ since this can lead to overwhelming overhead. For example, the wireless device can, instead, selects a 1×M beamforming vector g and report on the basis of the filtered values $a_p = g h_p$.

For example, when the network node receives the values $a_p$ from the K wireless devices, then the network node can have full CSI of the downlink channel:

$$A = \begin{bmatrix} a_{1,1} & a_{1,2} & \cdots & a_{1,P} \\ a_{2,1} & a_{2,2} & \cdots & a_{2,P} \\ \vdots & \vdots & \ddots & \vdots \\ a_{K,1} & a_{K,2} & \cdots & a_{K,P} \end{bmatrix},$$

where $a_{k,p}$ denotes the value $a_p$ for the kth wireless device. For example, the network node can serve all K wireless devices simultaneously using, e.g., beam suppression, such as zero-forcing through the Moore-Penrose inverse $A^+$. Zero-forcing may be seen as a precoding technique to address the interference problem by designing the optimization criteria to minimize for interference, such as multi-user interference, for example by using a detection/precoding matrix is the pseudoinverse of the CSI matrix.

However, the network node serving all K wireless devices simultaneously incurs overhead penalties for the wireless devices to report all P CSI-RS values, which may be significant based on the number of beams per wireless device and K. It may be envisaged that the wireless device is configured to report feedback of CSI-RS for each sub-band of a set of preconfigured sub-bands spanning the DL band, as opposed to the whole DL band. This further increases the overhead burden of CSI-RS feedback reporting.

To reduce the reporting overhead, an existing 3GPP technique is that the network node should indicate to each wireless device separately, how many CSI-RS the wireless device should report on. A wireless device according to the existing 3GPP technique can be configured to report on L=2, 3, or 4 beams of the network node for CSI-RS reporting. In other words, using matrix A, the network node can consider all un-reported CSI-RS values (e.g. P-L unreported CSI-RS values) as zeros, or at least negligible.

FIG. 1 is a diagram illustrating an example wireless communication system 1 comprising an example network node 400 and an example wireless device 300 according to this disclosure.

As discussed in detail herein, the present disclosure relates to a wireless communication system 1 comprising a cellular system, for example, a 3GPP wireless communication system, for example operating using FDD, such as in Frequency Range 1, FR1. The wireless communication system 1 comprises a wireless device 300 and/or a network node 400.

A network node disclosed herein refers to a radio access network (RAN) node operating in the radio access network, such as a base station, an evolved Node B, eNB, gNB in NR. In one or more examples, the RAN node is a functional unit which may be distributed in several physical units.

The wireless communication system 1 described herein may comprise one or more wireless devices 300, 300A, and/or one or more network nodes 400, such as one or more of: a base station, an eNB, a gNB and/or an access point.

A wireless device may refer to a mobile device and/or a user equipment, UE.

The wireless device 300, 300A may be configured to communicate with the network node 400 via a wireless link (or radio access link) 10, 10A.

Figure 2A:
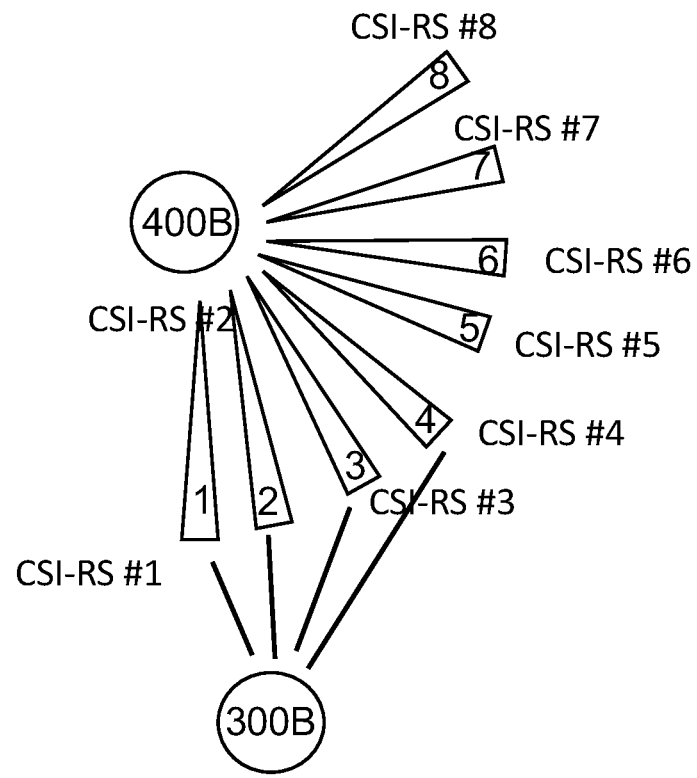
FIG. 2A-2C is a diagram illustrating an example channel state report over a set of beams in a known wireless communication system.
Figure 2B:
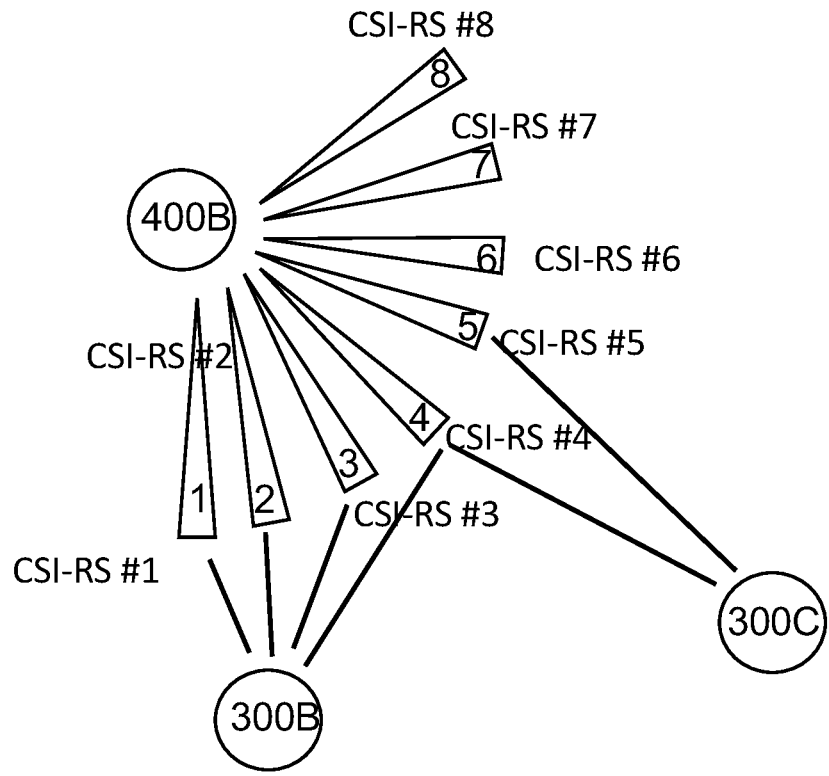
Figure 2C:
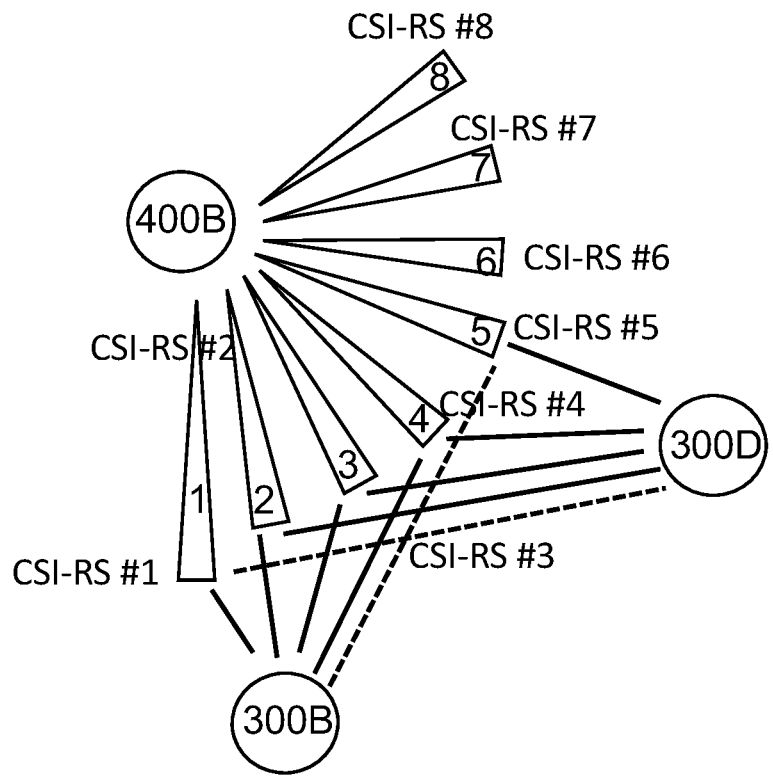

FIGS. 2A, 2B, 2C are schematic diagrams illustrating an example channel state report over a set of beams.

In FIGS. 2A, 2B, 2C, network node 400B may be configured to transmit CSI-RS #1, CSI-RS #2, CSI-RS #3, CSI-RS #4, CSI-RS #5, CSI-RS #6, CSI-RS #7, CSI-RS #8 on corresponding beams 1, 2, 3, 4, 5, 6, 7, 8 respectively.

The network node 400B may have configured wireless device 300B to report on L=4 beams for CSI-RS report. Let us assume that there are in fact precisely 4 strong CSI-RS beams that can reach wireless device 300B as indicated by the solid lines, the other P-4 CSI-RS beams reach wireless device 300B with negligible power and are disregarded. In FIG. 2A, the network node 400B receives for example 4 strong reports, such as {X1 dBm, X2 dBm, X3 dBm, X4 dBm} on beams identified as beams 1, 2, 3, 4, wherein X1>X2>X3>X4. For the next reporting period, for example, the network node may be able to lower the reporting for the wireless device 300B from 4 beams to e.g. 2 beams. As illustrated in FIG. 2A, when the wireless device 300B is the only wireless device that reported CSI for beam 3 and 4 (because no other wireless device appears to be scheduled to report CSI using beams 3 and 4), then the network node 400B can configure the wireless device 300B to report only to the 2 strongest beams (such as the two beams showing the highest quality parameter in the CSI report, such as the two best beams), and the network node 400B expects to receive reports on only two beams, which are for example beam 1 and 2. In other words, the wireless device 300B may hear 4 strong beams and is able to report accurate feedback for the 4 beams: 1, 2, 3, 4. The network node 400B can select any subset of the reported beams for communication with the wireless device 300B, such as beams 1 and 2. For example, the wireless device 300B may have been the only wireless device that reported channel state on beam 3 and 4, the network node 400B can simply disregard beams 3 and 4 from its data transmissions. Stated differently, the net effect may be that although 4 strong beams are estimated by wireless device 300B, it may be sufficient to report on 2 beams.

There may be several other wireless devices that are using beams 1, 2, 3, 4, as illustrated in FIG. 2B. Wireless device 300C hears two strong beams, of which one is shared with wireless device 300B, and reports them. When selecting a subset of beams for communicating with wireless device 300B, network node 400B needs to consider interference to/from wireless device 300C, for example especially in near-far situations. Reporting CSI report on the two strongest beams 1 and 2, followed by a network node 400B that constructs its precoder assuming zero or close to zero received power on beams 3 and 4 at wireless device 300B can lead to detrimental interferences for wireless device 300B, such as potentially devastating interferences. In other words, if the network node 400B would transmit to other wireless devices such as 300C, using beam 3 and 4. This would cause interference at wireless device 300B unless the wireless device 300B report CSI on beams 1, 2, 3, 4, then the network node 400B can make sure that no power on beam 3 and 4 reach the wireless device 300B (via precoding).

The detrimental situation can be resolved by beamforming when the wireless device is equipped with sufficiently many M antennas. For example, wireless device 300B equipped with M antennas can choose the vector g to null out beams 3 and 4. For example, wireless device 300B chooses the beamformer as, e.g., $$g = \mathop{\mathrm{argmax}}_{x} |xh_1|^2 + |xh_2|^2 \text{ such that } xh_3 = 0 \text{ and } xh_4 = 0$$

In other words, wireless device 300B can apply beam suppression, such as zero-forcing to beams 3 and 4, while maximizing the power in the reported beams 1 and 2. As a result, wireless device 300B does no longer report X1 dBm and X2 dBm (X1>X2) to beams 1 and 2, respectively, but slightly smaller values. On the other hand, the network node 400B is ensured that negligible (possibly no) interference reaches the wireless device 300B through beam 3 and 4.

In FIG. 2C, wireless device 300B hears 5 strong beams (e.g. beams 1, 2, 3, 4, 5) and is able to report accurate feedback for up to 4 beams (e.g. beams 1, 2, 3, 4 as indicated by a solid lines) and coarse feedback for a number of other strong beams (e.g. beam 5 as indicated by the dotted line). In FIG. 2C, wireless device 300D hears 5 strong beams (e.g. beams 1, 2, 3, 4, 5) and is able to report accurate feedback for up to 4 beams (e.g. beams 2, 3, 4, 5 as indicated by a solid lines) and coarse feedback for a number of other strong beams (e.g. beam 1 as indicated by the dotted line). Based on this information, the network node 400B may select a common set of beams for concurrent communication with wireless device 300B and wireless device 300D. For example, the network node 400B may select beams 1, 2, 3, 4 corresponding to CSI-RS #1, #2, #3 and #4. For example, the network node 400B may also select beams corresponding to CSI-RS #2, #3, #4 and #5, or even other subset of the reported beams. In other words, the network node 400B may force wireless device 300D to report the same beams as for wireless device 300B (or vice versa), although this would have not been the first choice of wireless device 300D. This is for the network node 400B to be able to accurately apply a zero-forcing precoding which can simultaneously serve wireless device 300B and wireless device 300D.

A challenge remains in FIGS. 2A-2C in that the wireless device 300B does not know whether to apply beam suppression (such as to perform zero-forcing) when computing the reported values. The reported values can take the form of a precoding matrix indicator (PMI). The beam suppression information is only available at the network node 400B. In a situation where the network node 400B has observed that there are indeed 4 strong beams reaching wireless device 300B, but that these beams are unused by other wireless devices (e.g., in the extreme case in which wireless device 300B is the only connected UE), it is not beneficial for wireless device 300B to apply beam suppression (e.g. zero forcing). In fact, beam suppression may degrade performance since a suboptimal precoder is used and consumes additional power. In absence of an indication from the network node, a wireless device may nonetheless decide to apply beam suppression to the set of other strong beams, which may be suboptimal in case there are no more wireless devices served CSI-RS beams reaching the wireless device.

Another challenge may arise when looking at the set of DL-CSI RS beams transmitted by the network node with a certain periodicity. For example, values of the DL CSI-RS period are in the order of a few milliseconds, for example, 5 milliseconds. (Note that during this time, 70 OFDM symbols and 140 OFDM symbols can be transmitted if subcarrier spacings of 15 KHz and 30 KHz are used, respectively.) In some scenarios, the period of the DL CSI-RS beams may be too large to adequately track variations of the propagation channel. This is, however, not critical for data transmitted by the network node using the L∈{2,3,4} DL CSI-RS beams reported by the wireless device for data transmissions to the UE. This is because data transmissions are accompanied by pilots, e.g., Demodulation Reference Signal, DMRS, and Tracking Reference Signal, TRS, pilots, which can be used by the wireless device to update its current knowledge of the channel. However, there are no pilots in the existing specification that can be used by the wireless device to update its current knowledge of the beam suppression (such as the null space). Consequently, multi-user interference may be expected to increase between DL CSI-RS beam occasions, thereby degrading the quality of the channel experienced by the wireless device or the network node not being able to schedule traffic on the corresponding resources. Therefore, the existing 3GPP technique needs to be improved because the network node of the existing technique cannot assist the wireless device in choosing appropriate beamforming operations during reporting, nor can the network node appropriately update its knowledge of the interference from other wireless devices, e.g. concurrently scheduled users.

The present disclosure allows the network node to indicate beam suppression applicable to a subset of beams, and to know that the wireless device intends to apply beam suppression (e.g. zero forcing) and, more precisely, which beam (such as DL CSI-RS beams) the wireless device needs to suppress or null out. For example, when aware of this information, the disclosed network node can refrain from scheduling other wireless devices in the subset of beams (such as subset of reporting CSI-RS beams) to be suppressed by the wireless device. The disclosed network node can indicate to the wireless device to apply or not apply beam suppression (e.g. zero-forcing) to a subset of beams, such as a first subset.

The disclosed technique provides, inter alia, a technique that utilizes the wireless device's inherent ability to mitigate some of the propagation paths between the network node and the wireless device. In brief, the disclosed network node can lower the channel state feedback from the wireless device by instructing the wireless device to perform beam suppression or not via the disclosed control signaling indicative of beam suppression.

Beam suppression disclosed herein may be seen as an attenuation of beams carrying interfering signals to an acceptable level so as to mitigate interference. Examples of beam suppression techniques may include a zero-forcing technique. Beam suppression may herein also be referred to as (multi-)beam interference mitigation. Beam suppression may herein be used to attenuate interference from undesired beams to an acceptable level.

Figure 3A:
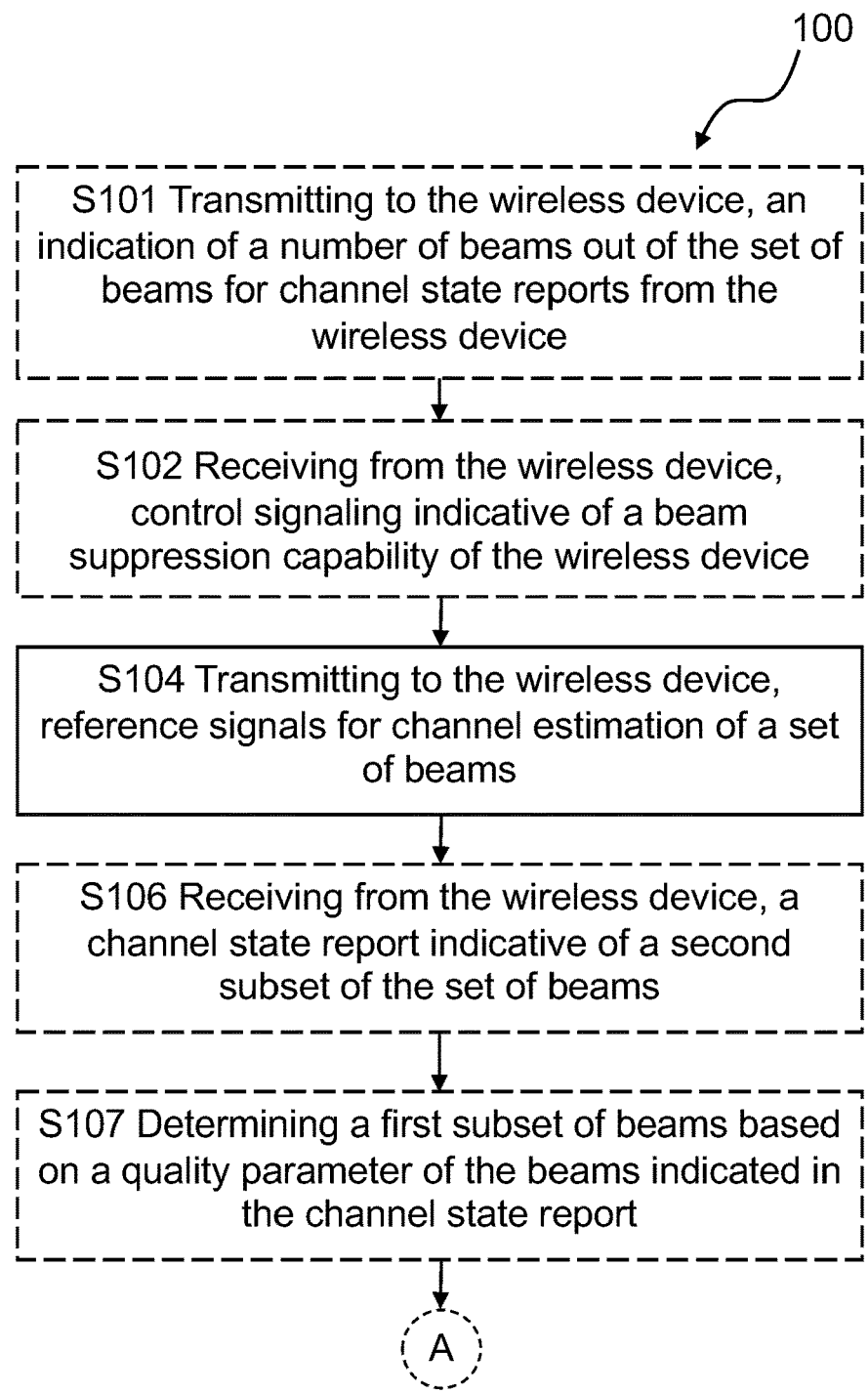
FIGS. 3A-3B is a flow-chart illustrating an example method, performed in a network node of a wireless communication system, for beam suppression at a wireless device.
Figure 3B:
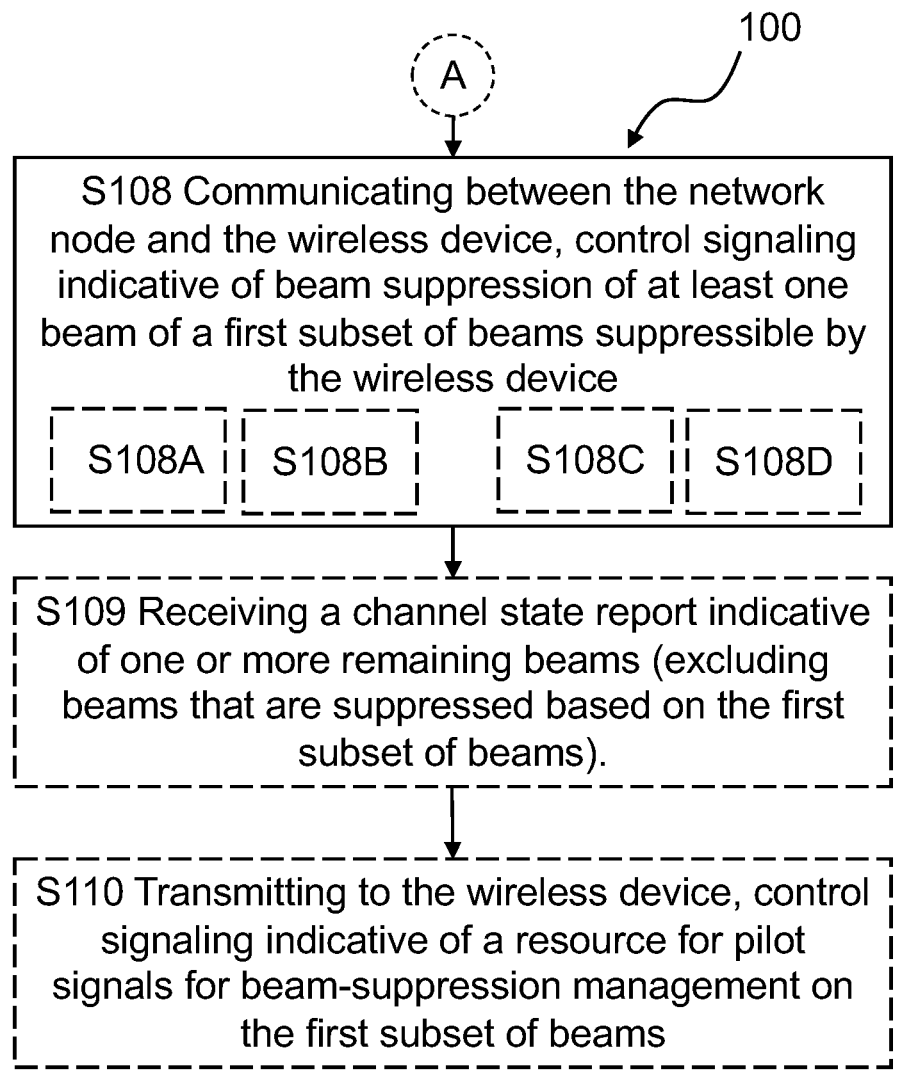

FIGS. 3A-3B shows a flow diagram of an example method 100, performed by a network node according to the disclosure, for beam suppression at a wireless device. The wireless device is configured to communicate with the network node. The network node is the network node disclosed herein, such as network node 400 of FIG. 1 and FIG. 5. The method 100 may be performed for beam interference mitigation.

The method 100 comprises transmitting S104, to the wireless device, reference signals for channel estimation of a set of beams. The set of beams may be seen as a set of spatial filters, where each beam is indicative of a spatial direction. The set of beams may be seen as a set of beams of the network node, e.g. radiated by the network node, such as Downlink DL beams, such as Transmit (Tx) beams. A set of beams comprises a plurality of beams.

The reference signals may be seen as signals used by the wireless device, for estimating a channel quality of each beam of the set of beams. The reference signals may comprise Channel State Information Reference Signal (CSI-RS). In some examples, the reference signals may comprise Demodulation Reference Signals (DMRS).

The method 100 comprises communicating S108, between the network node and the wireless device, control signaling indicative of beam suppression of at least one beam of a first subset of beams suppressible by the wireless device. A beam being suppressible may be seen as a beam being allowed or permitted or preferred to be suppressed. A beam being suppressible may in some embodiments comprise a beam that is to, such as shall be, suppressed by the wireless device. It may be appreciated that a beam which is suppressed by the wireless device, results in no channel state report on the suppressed beam. For example, the channel state report may indicate only strong beams, and a suppressed beam cannot be seen by the wireless device as a strong beam. Stated differently, the channel state on the suppressed beam is not be reported by the wireless device in subsequent channel state reports. This may result in a reduced number of channel state reports from the wireless device to the network node.

A first subset of beams suppressible may comprise one or more beams suppressible by the wireless device.

In one or more example methods, the control signaling indicative of beam suppression may comprise control signaling indicating whether the wireless device is to apply beam suppression, such as whether the wireless device is to activate beam suppression. It may be appreciated that beam suppression may be activated or deactivated, such as ON or OFF, by the network node, such as via S108.

Figure 4A:
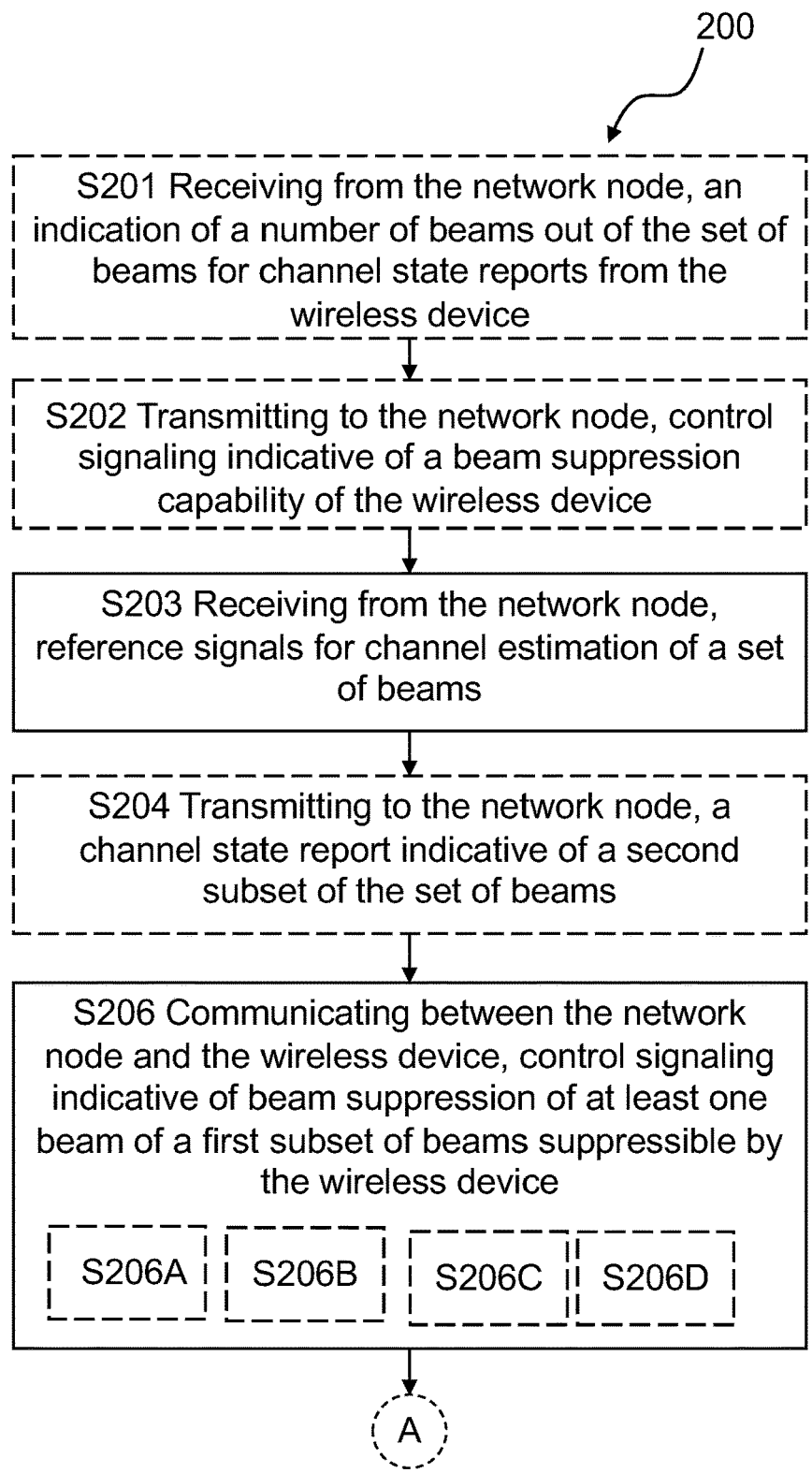
FIGS. 4A-4B is a flow-chart illustrating an example method, performed in a wireless device of a wireless communication system, for beam suppression at the wireless device.
Figure 4B:
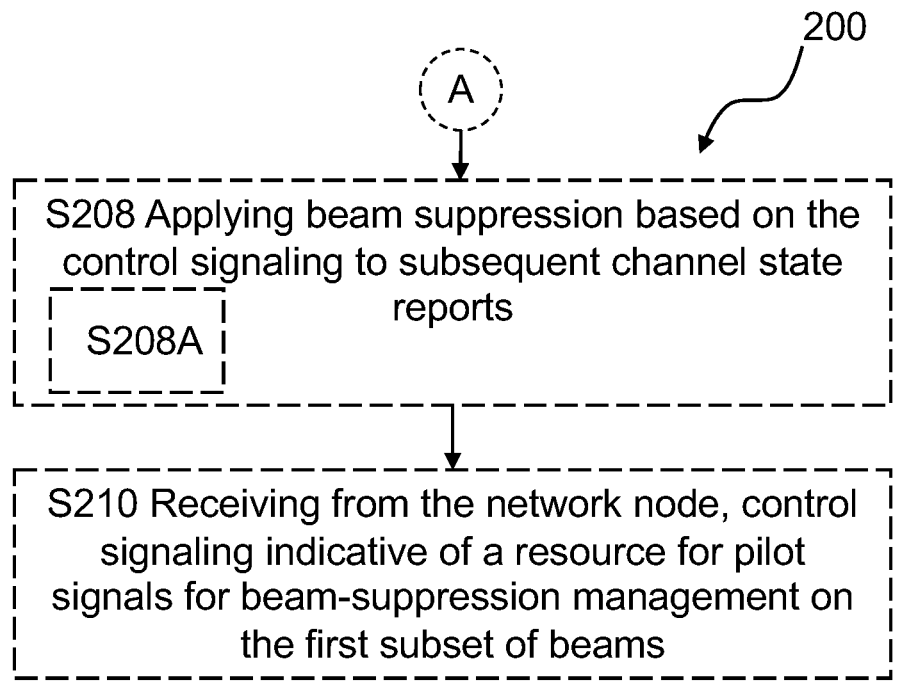

This step S108 corresponds to step S206 performed by the wireless device as shown in relation to FIGS. 4A-4B In one or more example methods, the method 100 comprises receiving S109 a channel state report indicative of channel state estimation on one or more remaining beams (excluding beams that are suppressed based on the first subset of beams). For example, the network node receive subsequent channel state report(s) indicative of one or more remaining beams on a third subset of beams excluding beams that are suppressed based on the first subset of beams. It may be appreciated that the resulting channel state reports are reduced compared to channel state reports before beam suppression indicated in S108.

In one or more example methods, the communicating S108 comprises transmitting S108A, to the wireless device, an indication that beam suppression is to be applied by the wireless device to at least one beam of the first subset. An indication that beam suppression is to be applied by the wireless device to at least one beam of the first subset may be seen as an indication that beam suppression is requested to be applied by the wireless device to at least one beam of the first subset (for example that the network node requests the wireless device to apply beam suppression to the first subset of beams). In other words, the network node can indicate in S108A to the wireless device that beam suppression is to be activated by the wireless device. For example, the wireless device receiving the indication in S108A, shall apply beam suppression to at least one beam of the first subset indicated in S108A. This step S108A corresponds to step S206A performed by the wireless device as shown in relation to FIGS. 4A-4B In one or more example methods, the communicating S108 comprises transmitting, to the wireless device, control signaling indicating one or more beam indices, such as one or more indices associated with a group of beams, corresponding to one or more beams that are to be suppressed by the wireless device. A beam index may be seen as a parameter indexing a beam in the set of beams, or in a group of beams, such as a beam identifier.

In one or more example methods, the control signaling may implicitly indicate the beams to be suppressed by the wireless device. For example, the wireless device does not need to know explicitly which beams it actually suppress because the suppression-DRMS configuration from the network node can be directly used by the wireless device, as a standard DMRS, when the wireless device dynamically compute its precoder (or equalizer). For example, If no suppression-DMRSs are configured, there is obviously no suppression active. For example, the implicitly indication of the beams may be the state of the DRMS configuration, which can be the only information the wireless device receive based on the list of suppressible beams.

In one or more example methods, the control signaling may indicate that the wireless device is to suppress as much as possible, such as to suppress as many beams as possible, such as to suppress as many beams as possible in a group of beams.

In one or more example methods disclosed herein, the set of beams may comprise P number of beams which may be indexed by the numbers 1-P. In other words, the network node may be configured to transmit CSI-RS on the set of beams, such as on the P beams. In one or more examples, the set of beams may comprise 32 beams, such as Channel State Information Reference Signal (CSI-RS) beams, which may be indexed by the numbers 1-32. In other words, in the example given here P is 32. The CSI-RS beams may herein be seen as beams of the network node used for transmitting CSI-RS from the network node, such as by broadcasting the CSI-RS.

The network node may group the set of beams, such as the 32 beams, in one or more groups, which may be referred to as one or more beam groups or group of beams. The beam groups may be of the same or of different size, such as comprising the same or different number of beams. In some embodiments, the network node can determine the groups based on reports from the wireless devices (for example initially there might be a single group consisting of all beams).

In one or more example methods, the communicating S108 comprises transmitting S108D, to the wireless device, control signalling indicative of one or more groups of beams suppressible by the wireless device, wherein a beam in a group of beams is considered suppressible (such as suppressed) by the wireless device when the beam is unreported by the wireless device in the channel state reporting. A beam being unreported by the wireless device may herein be seen as a beam that has not been reported by the wireless device in the channel state report. The control signalling indicative of one or more group of beams suppressible by the wireless device may be seen as an indirect indication of suppression of unreported beams. In other words, the first subset of beams of S108 may be indicated as one or more groups of beams in some embodiments. For example, the control signaling transmitted by the network node may indicate the groups of beams with indices {{1-10}, {12-15}} as being suppressible (e.g. group 1: {1-10} and group 2: {12-15}). In one or more example methods, the first subset of beams may comprise the groups of beams including the following beam indices {{1-10}, {12-15}}. The control signaling may indicate that when the wireless device reports CSI for any beam(s) with indices in group {1-10} or in group {12-15}, a beam with unreported CSI which has an index in, and only in, group {1-10} or group {12-15} is to be suppressed by the wireless device, such as to be suppressed in a subsequent channel state report sent from the wireless device. Upon the wireless device reporting CSI for, for example, beam 17 (e.g. with index 17) of the 32 beams, there is no need for any suppression, since beam index 17 does not show an index comprised in any of the groups of beam indicated in the control signaling as being suppressible.

For example, the wireless device may report CSI for four beams, such as L=4, out of the set of beams. The wireless device may have measured on the CSI-RS of the set of beams and may have determined that beams with respective index 1, 2, 12 and 16 are the four beams having the highest channel quality, such as the highest signal strength. For example, in the channel state report for beams 1-2, which are comprised in the exemplary beam group {1-10}, the wireless device is thus to suppress the unreported beams in the group, such as beams with index in the range 3 to 10 in subsequent channel state reports. For example, in the channel state report for beam with index 12, which are comprised in the exemplary beam group {12-15}, the wireless device is thus to suppress the unreported beams in the group, such as beams 13-15, in subsequent channel state reports. For example, in the channel state report for beam with index 16, the wireless device is not to suppress any beams, since beam with index 16 does not have an index comprised in any of the groups of beam to be suppressible.

In some example methods, the network node may indicate in control signalling S108 the full set of beam indices {1-32} as a single group of suppressible beams. The control signaling S108 may thus indicate to the wireless device, that the wireless device may suppress all beams of the set of beams other than the beams reported by the wireless device as strong beams.

In one or more example methods, the network node may indicate in control signaling S108a group of beams using one or more indices, such as beam group with index {1-10}. The network node may know that only beam indices {1-10} are associated with beams that are directed towards the wireless device.

It may be envisaged in one or more example methods that when the control signaling indicates the full set of beam indices, the wireless device may suppress as many beams as possible, such as all of the beams except for the beams that the wireless device has reported CSI for.

In one or more example methods, communicating S108 comprises transmitting S108C, to the wireless device, an indication that the network node does not support assisting beam suppression at the wireless device (e.g. the network node does not activate or deactivates beam suppression at the wireless device, e.g. the network node does not request beam suppression at the wireless device, e.g. the network node indicates beam suppression OFF for the wireless device). The network node may for example indicate, such as in the control signaling, that the network is not transmitting pilot signals for suppression management, such as DMRS symbols. The network node may therefore not request the wireless device to suppress any beams. By indicating that the network node does not support assisting beam suppression, beam suppression may be indicated as being inactive. The indication that the network node does not assist beam suppression may be transmitted when the network node has determined that an interference level on the beams are below a cost threshold, so that the cost of applying beam suppression is higher than the actual interference on the beams. In this case, it may not be beneficial for wireless device to apply beam suppression.

In one or more example methods, beam suppression may be applied, by default, to beams for which an indication indicating that the network node does not support assisting beam suppression at the wireless device (such as beam suppression is OFF, such as beam suppression is not required or needed or requested) has not been signaled. The network node may thus, by transmitting in S108C the indication that the network node does not assist beam suppression at the wireless device, instruct the wireless device to cease suppressing such beams. In other words, the wireless device may be instructed by the network node in S108C to stop applying beam suppression, based on this indication.

This step S108C corresponds to the step S206B performed by the wireless device as described in relation to FIGS. 4A-4B.

In one or more example methods, the method 100 comprises transmitting S101, to the wireless device, an indication of a number of beams out of the set of beams for channel state reports from the wireless device. The network node may transmit, to the wireless device, such as in the control signaling, the number $L \in \{2,3,4\}$ or any other number of beams that the wireless device is to report CSI on. In other words, the network node may indicate to the wireless device whether the wireless device is to report CSI on 2, 3 or 4 beams out of the set of beams.

In one or more example methods, the network node may indicate a different number of beams for UL and DL, based the capability of the wireless device. For example, the wireless device may support 4 DL streams (such as have 4 antennas and 4 receive chains) but only support 1 or 2 UL streams (4 antennas that can be fed by only 1 or 2 transmit chains).

This step S101 corresponds to step S201 performed by the wireless device as shown in relation to FIGS. 4A-4B.

In one or more example methods, the method 100 comprises receiving S106, from the wireless device, a channel state report indicative of a second subset of the set of beams. The second subset may be a proper subset of the set of beams. The second subset may comprise one or more beams. The channel state reports S106 indicative of the second subset are received before applying beam suppression and may be used for determining beam suppression. This step S106 corresponds to step S204 performed by the wireless device as shown in relation to FIGS. 4A-4B.

The second subset of beams may comprise a number of strong beams, such as the beams showing the highest channel quality parameter, such as a highest Reference Signal Receive Power (RSRP), based on measurements performed by the wireless device on the reference signals, such as CSI-RS, transmitted by the wireless device over the set of beams.

The wireless device may measure on the CSI-RS to determine the strongest beams to report. The wireless device may report the number of strong beams based on e.g. the indication of the number of beams for channel reports received from the network node. When for example the network node has indicated that CSI is to be reported for 3 beams, the wireless device may report the three strongest beams, such as the beams having the highest channel quality parameter. In this case, the second subset of beams comprises three beams. The wireless device may be configured to use one or more of the strong beams for transmissions, such as data transmissions, to the network node.

In one or more example embodiments, the network node may indicate, out of the set of beams, such as of all DL CSI-RS beams, a number of beams, such as CSI-RS beams from which the wireless device is allowed to report the $L \in \{2,3,4\}$ beams for data transmissions. The number of beams may correspond in some embodiments to the second subset of beams reported in the channel state reports of S106.

In one or more example methods, the first subset and the second subset of beams may have overlapping elements, such that one or more beams may be comprised in both the first subset and the second subset of beams. The first subset and the second subset of beams are specific to each wireless device. In one or more example methods, the first subset and the second subset of beams can evolve dynamically as required by variations in the channel. In other words, the first subset and the second subset of beams can be reconfigured dynamically, such as based on channel state information, such as based on a channel quality parameter, for the beams.

The channel state information may be communicated between one or more wireless devices and the network node.

In one or more example methods, the first subset is a subset of the second subset of beams. When the network node configures the number of beams to which the wireless device is to report CSI, the network node may indicate whether or not beam suppression (such as zero-forcing) is to be applied to one or more of the reported beams, such as of the second subset of beams. In other words, a subset of the reported beams (corresponding here to the first subset being a subset of the second subset) may thus be indicated as being suppressible by the wireless device in S108. In other words, no channel state reports may be required, requested and/or desired to be sent by the wireless device for the reported beams indicated as being suppressible by the first subset. In other words, the wireless device may report only channel state reports of remaining strong beams (such as beam(s) which are in the second subset but not in the first subset).

This may result in a reduced number of channel state reports received from the wireless device.

This may be indicated in control signaling, such as by means of a single bit in the control signaling. In other words, the first subset of suppressible beams may be determined by the network node based on the second subset of beams, such as the strong beams originally reported by the wireless device (as the second subset in S106). For example, if one or more beams of the second subset of beams initially reported by the wireless device as being strong beams are used by the network node for communication with another wireless device, the network node may select these one or more beams as part of the first subset, and request that the wireless device suppresses at least one beam of the first subset. The wireless device does not report in the next channel state report any channel state estimation on the suppressed beam(s) of the first subset. The wireless device may thus refrain from measuring and reporting on the suppressed beam(s) of the first subset in subsequent channel state reports.

In one or more example methods, the wireless device may determine to apply beam suppression (such as zero-forcing) to one or more of the beams of the first subset. When the wireless device intends to apply beam suppression to one or more beams of the first subset, the network node may receive an indication from the wireless device of the beams that the wireless device intends to suppress, such as null out. The indication received from the wireless device may comprise e.g. one or more beam identifier, such as one or more beam indices, identifying beams of the first subset.

The network node may receive channel state reports from one or more wireless devices. For example, the channel state reports allow the network node to get an overview of the channel state on its CSI-RS beams. Based on the channel state reports the network node may determine whether beam suppression is to be applied on one or more beams reported by the one or more wireless devices in order to improve the channel state on one or more of the beams, such as on one or more of the CSI-RS beams. For example, it may be assumed that a first wireless device and a second wireless device indicates the same beam as one of the strong beams in their respective channel state reports, or that the first wireless device indicates a beam on which the network node has transmitted CSI-RS intended for the second device. In one or more example methods, the network node may thus indicate to the wireless device, such as the first wireless device, that this beam is to be, such as shall be, suppressed by the wireless device for channel state estimation.

It may be envisaged that in one or more example methods, the network node may assist the wireless device's decision whether the wireless device should apply beam suppression, such as zero-forcing, or not, by providing to the wireless device an indication of a resource or a set of resources for transmitting CSI-RS (such as Non-Zero-Power (NZP) CSI-RS, CSI-IM and/or Zero-Power (ZP) CSI-RS) symbols for interference management. It may be noted that these resources for interference management are different from the resources for beam suppression management referred to in S110 above. In particular, the purpose of the interference management resources may be to allow the wireless device to estimate an amount of multi-user interference in order to estimate a cost of applying beam suppression. When applying beam suppression, there can be a penalty, however when the interference is high, it may be worth taking the penalty to reduce the interference. It may be noted that the resources for interference management are not to be allocated simultaneously with data and/or other pilot signals (such as regular DMRS/TRS pilot signals) intended for the wireless device taking the decision, such as a first wireless device. The resources for interference management may instead be allocated simultaneously with data and/or other pilot signals (such as regular DMRS/TRS pilot signals) intended for other wireless devices, such as one or more second wireless devices, so that the first wireless device is able to estimate the amount of multi-user interference from the one or more second wireless devices.

In one or more example methods, the method 100 comprises receiving S102, from the wireless device, control signaling indicative of a beam suppression capability of the wireless device. The beam suppression capability of the wireless device may be dependent on the hardware configuration of the wireless device, such as dependent on transceiver configuration of the wireless device, such as receiver chain configuration of the wireless device, such as number of receivers and/or transmitters of the wireless device. The wireless device may not have the same amount of receivers and transmitters available for UL transmission and downlink transmission. The beam suppression capability of the wireless device may therefore be specific for UL or DL. The wireless device may thus indicate its beam suppression capability for UL and/or DL to the network node.

This step S102 corresponds to step S202 performed by the wireless device as shown in relation to FIGS. 4A-4B.

In one or more example methods, the beam suppression capability comprises an indication of a number of beams of the second subset of beams that the wireless device is capable of suppressing. The wireless device may indicate to the network node that it is capable of suppressing one or more beams of the second subset, such as null out, N beams of the beams of the second subset of beams as indicated by the first subset. There may be remaining strong beams for channel estimation which are used to perform channel state reporting. The remaining strong beams may be seen as the strong beams reported by the wireless device that are not suppressed.

For example, the wireless device may indicate, possibly as part of beam suppression capability, to the network node, such as in the control signaling, the number of antennas and/or the number of streams it supports for UL and for DL respectively. The network node may be aware of the number of streams used for communicating with the wireless device, which may herein also be referred to as active streams. Each stream may be associated with a beam. The network node may, based on this information, determine the number of beams that the wireless device is capable of suppressing, by subtracting the number of streams used for transmission from the number of streams supported by the wireless device. The wireless device may thus implicitly indicate its beam suppression capability to the network node. It may be appreciated that although there may be requirements on the minimum amount of beams/transceivers that the wireless device shall use at all times, the network node cannot make assumptions on any number of additional transceivers that the wireless device is willing to use for a certain purpose, unless explicitly communicated by the wireless device. In one or more example methods, the network node may, based on the beam suppression capability received from the wireless device, determine which beams of the first subset of beams that the wireless device is to apply beam suppression to.

In one or more example methods, the method 100 comprises determining S107, the first subset of beams, such as the beams to be suppressed, based on a quality parameter of the beams indicated in the channel state report. The network node may determine, based on the quality parameter of the reported strong beams in the channel state report and/or based on the suppression capability of the wireless device, which beams out of the second subset of beams, such as the reported strong beams, that are to be suppressed. The network node may for example receive a channel state report indicating four strong beams, such as beams having a quality parameter, such as a measured power of {X1 dBm, X2 dBm, X3 dBm, X4 dBm} on beams identified as beams 1, 2, 3, 4. The network node may further receive a beam suppression capability for the wireless device of two beams. In this case the network node may determine that the beams 3 and 4, having the lowest quality parameter are to be suppressed by the wireless device. If the beam suppression capability indicates one beam, the network node may determine that beam 4 is to be suppressed, since it has the lowest quality parameter. The beam to be suppressed may be indicated to the wireless device via control signaling.

In one or more example methods, communicating S108 comprises transmitting S108B, to the wireless device, an indication of at least one beam index of the first subset of beams that are to be suppressed by the wireless device. The indication may be transmitted in control signaling. The indication may be implicit or explicit. For example, the at least one beam index may be indicated by control signalling indicative of a group of beams, such as a group of beam indices comprising one or more beam indices, indicating one or more beams that are suppressible. The network node may further have configured the wireless device to suppress all beams in the group of beam indices, except the beams comprised in the group which the wireless device reports as strong beams. The indication of the beam index of beams that are to be suppressed, may therefore be an implicit or indirect indication.

In one or more example methods, the network node may for example have determined one or more specific beam to be suppressed, such as based on the strong beams of the channel state report and the beam suppression capability of the wireless device. The network node may thus indicate, to the wireless device, the respective beam index of the one or more specific beams to be suppressed.

In one or more example methods, the beam index of the at least one beam to be suppressed may be indicated by the network node by configuring the wireless device with resources for beam suppression management, such as DMRS, associated with beams to be suppressed, such as interference management, IM, DMRS. The network node may transmit a configuration of the resources for transmission of DMRS on each beam to be suppressed. Based on the indication of the resource for DRMS, the wireless device may determine that the corresponding beam is to be suppressed. This allows the network node to shift beams to be suppressed dynamically without having to explicitly notify the wireless device of the beam to be suppressed.

This step S108B corresponds to the step S206C performed by the wireless device as described in relation to FIGS. 4A-4B.

In one or more example methods, the method 100 comprises transmitting S110, to the wireless device, control signaling indicative of a resource for pilot signals for beam-suppression management, such as DMRS symbols, on the first subset of beams. The network node may transmit the pilot signals for beam suppression, such as DMRS symbols on the first set of beams, such as on beams that are to be suppressed. The pilot signals for beam suppression management allow the wireless device to monitor the first subset of beams, such as to determine changing channel conditions on the first subset of beams in order to update and/or re-determine which beams to suppress for continuous efficiency.

In one or more example methods, such as when the network node has indicated a group of beam indices to be suppressed, DMRS symbols may be transmitted in all beams belonging to the groups in which the wireless device reported CSI for one or more beams. The DMRS symbols may be comprised in a data part of the transmission on the beams. This allows the wireless device to track, such as monitor, beams that it did not report to. Without the pilot signals the wireless device may not be able to maintain its beam suppression to the first set of beams, such as to maintain an optimal suppressing filter for reducing an inter user interference on the first set of beams.

It may be appreciated that beam suppression disclosed herein may be dynamically changed. It may be appreciated that the grouping of the beams may be dynamically changed in one or more example methods. In other words, the grouping may not be a one-time information sent at initial connection. The grouping of the beams may be changed, for example if the network node determines that it is not actually using e.g. beams 5-10 out of the group {1-10} in its data transmission to any wireless device. Then it may be lossy, such as a waste of energy, to require the wireless device to suppress these beams in the channel state reporting, such as CSI reporting. The network node may thus update the group {1-10} into {1-4}, such that only beams 1, 2, 3 and 4 remain in the group.

In one or more example methods, such as when the network node schedules transmissions to other wireless devices, such as one or more second wireless devices, in a set of suppressible strong beams reported by a first wireless device and using the same time-frequency resources, the network node may indicate to the wireless device the resource of a set of resources containing the pilot signals for beam suppression management, such as for reducing multi-user interference. The pilot signals may be DMRS particularly designed for beam suppression management, which may herein also be referred to as Interference Management (IM) DRMS. The IM DMRS are not to be transmitted simultaneously with data and/or other pilot signals (such as regular DMRS/TRS pilot signals) intended for the wireless device or for other wireless devices, since the data and/or other pilot signals may obscure the measurement on the IM DRMS.

In one or more example methods, the pilot signals for beam suppression management are precoded according to one or more precoding filters for one or more other wireless devices or non-precoded. The pilot signals for beam suppression management (such as DMRS both for data and suppression) may be precoded across the beams, such as the first set of beams (defined by the CSI-RS). In one or more example methods, the pilot signals for beam suppression management can be integrated with the pilot signals for data transmission, such as regular DMRS/TRS pilot signals.

FIGS. 4A-4B shows a flow diagram of an example method 200, performed by a wireless device according to the disclosure, for beam suppression at the wireless device. The wireless device is configured to communicate with the network node. The wireless device is the wireless device disclosed herein, such as wireless device 300 of FIG. 1 and FIG. 6. The method 200 may be performed for beam suppression, such as for mitigating beam interference.

The method 200 comprises receiving S203, from the network node, reference signals for channel estimation of a set of beams, such as of a set of spatial filters. The reference signals may be Channel State Information Reference Signal (CSI-RS). It may be appreciated that initially no beam suppression may be applied by the wireless device.

The method 200 comprises communicating S206, between the network node and the wireless device, control signaling indicative of beam suppression of at least one beam, such as a spatial filter, of a first subset of beams suppressible by the wireless device. A beam being suppressible may be seen as a beam being allowed or permitted or preferred to be suppressed. A beam being suppressible may in some embodiments comprise a beam that is to, such as shall be, suppressed by the wireless device. It may be appreciated that a beam which is suppressed will not be reported, as only strong beams are reported. A suppressed beam cannot be used by the wireless device for channel state reporting. A first subset of beams being suppressible may comprise one or more beams suppressible by the wireless device. For example, the control signaling indicative of beam suppression may indicate whether the wireless device is to, such as shall and/or allowed, apply beam suppression, such as whether the wireless device is to activate beam suppression. It may be appreciated that beam suppression may be activated or deactivated, such as ON or OFF.

Whether the wireless device is to apply beam suppression may be dynamically transmitted, such as by continuously monitoring channel state information and updating the indication based on a changing channel conditions on one or more beams.

This step S206 corresponds to step S108 performed by the network node as shown in relation to FIGS. 3A-3B.

Advantageously, the beam suppression communicated in S206 allows the wireless device to apply the beam suppression to at least one beam of the first subset, which results in a reduction of the number of channel state reports transmitted by the wireless device afterwards.

In one or more example methods, the method 200 comprises transmitting S204, to the network node, a channel state report indicative of a second subset of the set of beams. The second subset of beams may comprise a number of strong beams, such as the beams showing the highest channel quality parameter, such as a highest Reference Signal Receive Power (RSRP), based on measurements performed by the wireless device on the reference signals, such as CSI-RS, transmitted by the wireless device over the set of beams. It may be appreciated that initially the wireless device does not apply beam suppression and measures CSI-RS over the set of beams, such as over all of the beams comprised in the set of beams. The wireless device may measure on the CSI-RS to determine the strong beams to report in S204, and the strong beams form part of the second subset. The wireless device may report the number of strong beams based on e.g. the indication of the number of beams for channel reports received from the network node. The channel state report S204 indicative of the second subset is transmitted before applying beam suppression and may be used by the network node for determining beam suppression for the wireless device. This step S204 corresponds to step S106 performed by the network node as shown in relation to FIGS. 3A-3B In one or more example methods, the wireless device may determine to apply beam suppression (such as zero-forcing) to at least one beam of the first subset. In some embodiments, when the wireless device intends to apply beam suppression to one or more of the first subset, the wireless device may transmit an indication to the network node of the beams it intends to suppress, such as null out. The indication transmitted to the network node may e.g. be one or more beam identifier, such as one or more beam indices, identifying at least one beam of the first subset to be suppressed.

In one or more example methods, the first subset is a subset of the second subset of beams. A subset of the reported beams in the second subset may be indicated as being suppressible via the first subset of S206 by the wireless device. In other words, no channel state reports may be required to be sent for the beams of the second subset indicated as being suppressible in the first subset. This may be indicated in control signaling, such as by means of a single bit in the control signaling. For example, if one or more beams of the second subset of beams initially reported by the wireless device as being strong beams in the second subset are used by the network node for communication with another wireless device, the network node may select these one or more beams as part of the first subset, and request that the wireless device suppresses at least one beam of the first subset. The wireless device does not report in the next channel state report any channel state estimation on the suppressed beam(s) of the first subset. The wireless device may thus refrain from measuring and reporting on the suppressed beam(s) of the first subset in subsequent channel state reports.

In one or more example methods, communicating S206 comprises receiving S206A, from the network node, an indication that beam suppression is to be applied by the wireless device to at least one beam of the first subset. This step S206A corresponds to the step S108A performed by the network node as described in relation to FIGS. 3A-3B.

Upon the control signaling indicating that beam suppression is to be applied, the wireless device may receive control signaling indicating one or more beam indices, such as a group of beam indices, corresponding to one or more beams that are to be suppressed by the wireless device.

In one or more example methods, the control signaling may implicitly indicate the beams to be suppressed by the wireless device. In one or more methods, the control signaling may indicate that the wireless device is to suppress as much as possible, such as to suppress as many beams as possible.

In one or more example methods disclosed herein, the set of beams may comprise P number of beams which may be indexed by the numbers 1-P. In other words, the network node may be configured to transmit CSI-RS on the set of beams, such as on the P beams. In one or more examples, the set of beams may comprise 32 beams, such as CSI-RS beams, which may be indexed by the numbers 1-32. In other words, in the example given her P is 32.

In one or more example methods, the communicating S206 comprises receiving S206D, from the network node, control signaling indicative of one or more group of beams suppressible by the wireless device, wherein a beam in a group of beams is suppressible by the wireless device when the beam is unreported by the wireless device in the channel state report. A beam being unreported by the wireless device may herein be seen as a beam that has not been reported as by the wireless device in the channel state report. The control signaling indicative of one or more group of beams suppressible by the wireless device may be seen as an indirect indication of suppression of unreported beams. In other words, the first subset of beams of S206 may be indicated as one or more groups of beams in some embodiments. For example, the control signaling received by the wireless device may indicate the groups of beams with indices {{1-10}, {12-15}} as being suppressible (e.g. group 1: {1-10} and group 2: {12-15}). In one or more example methods, the first subset of beams may comprise the groups of beams including the following beam indices {{1-10}, {12-15}}. The control signaling may indicate that when the wireless device reports CSI for any beam(s) with indices in group {1-10} or in group {12-15}, a beam with unreported index in, and only in, group {1-10} or group {12-15} is to be suppressed by the wireless device, such as to be suppressed in a subsequent channel state report sent from the wireless device. Upon the wireless device reporting CSI for, for example, beam 17 (e.g. with index 17) of the 32 beams there is no need for any suppression, since beam index 17 does not show an index comprised in any of the groups of beams indicated in the control signaling as being suppressible.

For example, the wireless device may report CSI for four beams, such as L=4, out of the set of beams. The wireless device may have measured on the CSI-RS of the set of beams and may have determined that beams with respective index 1, 2, 12 and 16 are the four beams having the highest channel quality, such as the highest signal strength. For example, in the channel state report for beams 1-2, which are comprised in the exemplary beam group {1-10}, the wireless device is thus to suppress the rest of the beams in the group, such as beams with index in the range 3 to 10. For example, in the channel state report for beam with index 12, which are comprised in the exemplary beam group {12-15}, the wireless device is thus to suppress the rest of beams in the group, such as beams 13-15. For example, in the channel state report for beam with index 16, the wireless device is not to suppress any beams, since beam with index 16 does not have an index comprised in any of the groups of beams to be suppressible.

In some example methods, the wireless device may receive, in control signaling S206, an indication indicating the full set of beam indices {1-32} as a single group of suppressible beams. For example, the control signaling S206 in this example may indicate to the wireless device, that the wireless device may suppress beams of the full set of beams other than the beams reported (e.g. in S204) by the wireless device as strong beams.

In one or more example methods, the wireless device may receive an indication in control signaling S206A of a group of beams using one or more indices, such as beam group with index {1-10}. The beam suppression and/or the grouping of the beams may be dynamically changed. The grouping of the beams may be changed, for example if the network node determines that it is not actually using e.g. beams 5-10 out of the group {1-10} in its data transmission to any wireless device. Then it may be lossy, such as a waste of energy, to require the wireless device to suppress these beams in the channel state reporting, such as CSI reporting. The wireless device may thus receive an updated group comprising only {1-4}, such that only beams 1, 2, 3 and 4 remain in the group.

In one or more example methods, communicating S206 comprises receiving S206C, from the network node, an indication of at least one beam index of the first subset of beams that are to be suppressed by the wireless device. The indication may be transmitted in control signaling. The indication may implicitly or explicitly indicate the beam index of the at least one of the first subset of beams that are to be suppressed. This step S206C corresponds to the step S108B performed by the network node as described in relation to FIGS. 3A-3B.

In one or more example methods, the at least one beam index may comprise a plurality of beam indices, such as a group of beam indices, indicating a plurality of beams that are suppressible. The wireless device may be configured, such as via control signaling, by the network node to suppress all beams in the group of beam indices, except the beams comprised in the group which the wireless device reports as strong beams. The indication of the beam index of beams that are to be suppressed, may therefore be an implicit or indirect indication, dependent on the strong beams determined by the wireless device.

In one or more example methods, the network node may for example have determined one or more specific beams to be suppressed, such as based on the strong beams of the channel state report and the beam suppression capability of the wireless device. The network node may thus indicate, to the wireless device, the respective beam index of the one or more specific beams to be suppressed.

In one or more example methods, the beam index of the at least one beam to be suppressed may be indicated by configuring the wireless device with resources for beam suppression management, such as DMRS, associated with beams to be suppressed, such as interference management, IM, DMRS. The wireless device may receive an indication of the resources for transmission of DMRS on each beam to be suppressed. Based on the indication of the resource for DRMS, the wireless device may determine that the corresponding beam is to be suppressed. This allows the network node to shift beams to be suppressed dynamically without having to explicitly notify the wireless device of the beam to be suppressed.

In one or more example methods, the method 200 comprises applying S208 beam suppression to subsequent channel state reports based on the control signaling. Applying beam suppression may herein be seen as refraining from estimating the channel on the suppressed beams, such as by applying zero-forcing. This may be seen as excluding suppressed beams, such as at least one of the first subset of beams, from subsequent channel state reports transmitted by the wireless device. The wireless device may suppress, such as attenuate interference from undesired beams, such as beams not used for data transmission between the network node and the wireless device, to an acceptable level, based on the control signaling received. Thereby the number of beams, such as CSI-RS beams, reported by the wireless device may be reduced, which lower the channel state feedback from the wireless device.

In one or more example methods, the applying S208 may comprise transmitting S208A, to the network node, a channel state report indicative of channel state estimation on one or more remaining beams (excluding beams that are suppressed based on the first subset of beams). In other words, for example, transmitting S208A, to the network node, the channel state report (e.g. subsequent channel state report) comprises transmitting, to the network node, a subsequent channel state report indicative of channel state estimation on a third subset of beams, wherein the third subset of beams excludes the beam(s) that are suppressed based on the first subset of beams. It may be appreciated that the resulting channel state reports are reduced compared to channel state reports before beam suppression indicated, e.g. in S206.

In one or more example methods, the method 200 comprises receiving S201, from the network node, an indication of a number of beams out of the set of beams for channel state reports from the wireless device. The wireless device may receive, from the network node, such as in the control signaling, the number $L \in \{2,3,4\}$ of beams or any other number of beams, such as spatial filters, such as downlink spatial filters, that the wireless device is to report CSI on. In other words, the network node may indicate to the wireless device whether the wireless device is to report CSI on 2, 3 or 4 beams out of the set of beams. This step S201 corresponds to step S101 performed by the network node as shown in relation to FIGS. 3A-3B.

In one or more example embodiments, the wireless device may receive an indication indicating a second subset of beams, such as CSI-RS beams from which the wireless device is allowed to report the $L \in \{2,3,4\}$ beams for data transmissions, and a first subset of beams suppressible by the wireless device. The first subset of beams and the second subset of beams are subsets of the set of beams, such as a subset of all of the DL CSI-RS beams.

In one or more example methods, the network node may indicate a different number of beams for UL and DL, based the capability of the wireless device. For example, the wireless device may support 4 DL streams (such as have 4 antennas and 4 receive chains) but only support 1 or 2 UL streams (4 antennas that can be fed by only 1 or 2 transmit chains).

In one or more example methods, the method 200 comprises transmitting S202, to the network node, control signaling indicative of a beam suppression capability of the wireless device. The beam suppression capability of the wireless device may be dependent on the hardware configuration of the wireless device, such as dependent on the number of receivers and transmitters of the wireless device. The wireless device may not have the same amount of receivers and transmitters available for UL transmission and downlink transmission. The beam suppression capability of the wireless device may therefore be specific for UL or DL. The wireless device may thus indicate its beam suppression capability for UL and/or DL to the network node.

In one or more example methods, the beam suppression capability comprises an indication of a number of beams of the second subset of beams that the wireless device is capable of suppressing. The wireless device may indicate to the network node that it is capable of suppressing one or more beams of the second subset, such as null out, N beams of the beams not used of the second subset of beams.

For example, the wireless device may indicate to the network node, such as in the control signaling, the number of antennas and/or the number of streams it supports for UL and for DL respectively. The wireless device may thus implicitly indicate its beam suppression capability to the network node. It may be appreciated that, although there may be requirements on the minimum amount of beams and/or transceivers that the wireless device shall use at all times, the network node cannot make assumptions on any number of additional transceivers that the wireless device is willing to use for a certain purpose, unless explicitly communicated by the wireless device. In one or more example methods, the network node may, based on the beam suppression capability received from the wireless device, determine which beams of the first subset of beams that the wireless device is to apply beam suppression to.

This step S202 corresponds to step S102 performed by the network node as shown in relation to FIGS. 3A-3B.

In one or more example methods, the method 200 comprises receiving S210, from the network node, control signaling indicative of a resource for pilot signals for beam-suppression management on the first subset of beams. The wireless device may receive the pilot signals for beam suppression, such as DMRS symbols on the first set of beams, such as on beams that are to be suppressed. The pilot signals for beam suppression management allow the wireless device to monitor the first subset of beams, such as to determine changing channel conditions on the first subset of beams in order to update and/or re-determine which beams to suppress for continuous efficiency.

In one or more example methods, such as when the wireless device has received an indication of a group of beam indices to be suppressed, DMRS symbols may be transmitted in all beams belonging to the groups in which the wireless device reported CSI for one or more beams. The DMRS symbols may be comprised in a data part of the transmission on the beams. This allows the wireless device to track, such as monitor, beams that it did not report to. Without the pilot signals the wireless device may not be able to maintain its beam suppression to the first set of beams, such as to maintain an optimal suppressing filter for reducing an inter user interference on the first set of beams.

In one or more example methods, such as when the network node schedules transmissions to other wireless devices, such as one or more second wireless devices, in a set of suppressible strong beams reported by a first wireless device and using the same time-frequency resources, the network node may indicate to the wireless device the resource of a set of resources containing the pilot signals for beam suppression management, such as for reducing multi-user interference. The pilot signals may be DMRS particularly designed for beam suppression management, which may herein also be referred to as Interference Management (IM) DRMS. The IM DRMS are not to be transmitted simultaneously with data and/or other pilot signals (such as regular DMRS/TRS pilot signals) intended for the wireless device or for other wireless devices, since the data and/or other pilot signals may obscure the measurement on the IM DRMS.

In one or more example methods, the pilot signals are precoded according to one or more precoding filters for one or more other wireless devices or non-precoded. The pilot signals for beam suppression management (such as DMRS both for data and suppression) may be precoded across the beams, such as the first set of beams (defined by the CSI-RS).

In one or more example methods, communicating S206 comprises receiving S206B, from the network node, an indication that the network node does not support assisting beam suppression at the wireless device (e.g. the network node does not activate or deactivates beam suppression at the wireless device). The indication may for example indicate that the network is not transmitting pilot signals for suppression management, such as DMRS symbols. The network node may therefore not be able to assist the wireless device in monitoring any suppressed beams, in order to update its current knowledge of the beam suppression (such as the null space). This may lead to an increased multi-user interference between DL CSI-RS beam occasions, thereby degrading the quality of the channel experienced by the wireless device. The indication may indicate that beam suppression is not being available for the wireless device, such as being inactive. The wireless device may thus refrain from applying beam suppression based on the indication. This step S206B corresponds to the step S108C performed by the network node.

In one or more example methods, beam suppression may be applied, by default, to beams for which an indication indicating that the network node does not support assisting beam suppression (such as beam suppression is OFF, such as beam suppression is not required or not needed or not requested) has not been signaled. The wireless device may thus, based on the indication that the network node does not assist beam suppression, cease suppressing such beams. In other words, the wireless device may stop applying beam suppression, based on this indication.

This step S206B corresponds to the step S108C performed by the network node as described in relation to FIGS. 3A-3B.

Figure 5:
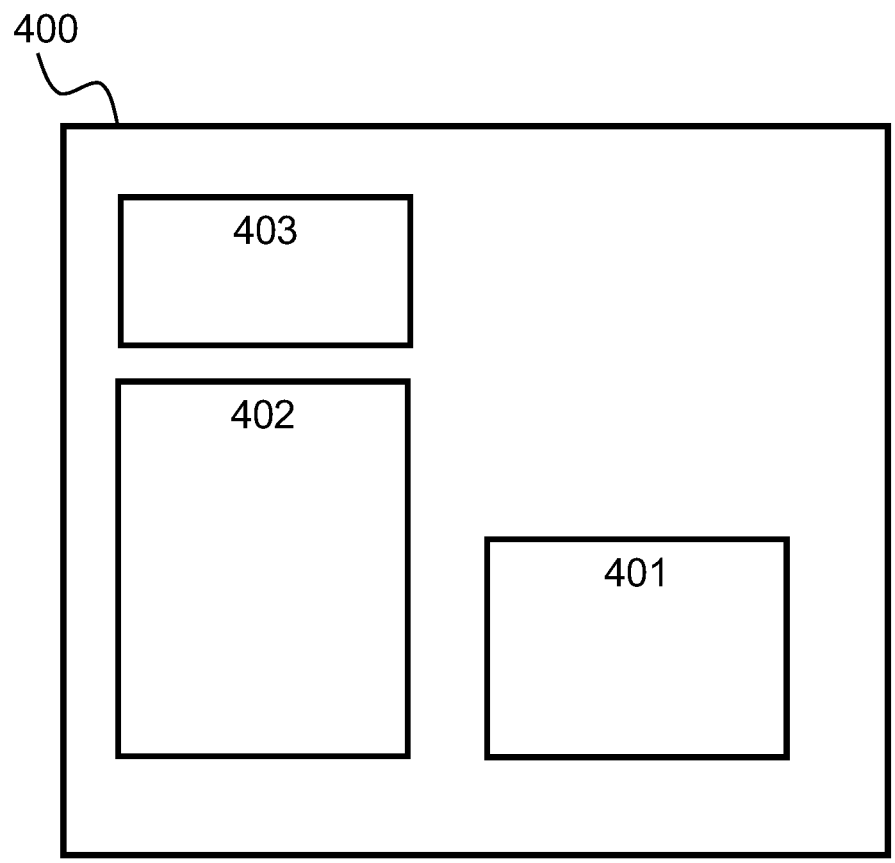
FIG. 5 is a block diagram illustrating an example network node according to this disclosure.

FIG. 5 shows a block diagram of an example network node 400 according to the disclosure. The network node 400 comprises memory circuitry 401, processor circuitry 402, and a wireless interface 403. The network node 400 may be configured to perform any of the methods disclosed in FIGS. 3A-3B. In other words, the network node 400 may be configured for beam suppression at a wireless device.

The network node 400 is configured to communicate with a wireless device, such as the wireless device disclosed herein, using a wireless communication system.

The wireless interface 403 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M.

The network node 400 is configured to transmit, to the wireless device, for example, via the wireless interface 403, reference signals for channel estimation of a set of beams.

The network node 400 is configured to communicate between the network node and the wireless device, for example, via the wireless interface 403, control signaling indicative of beam suppression of at least one beam of a first subset of beams suppressible by the wireless device.

Processor circuitry 402 is optionally configured to perform any of the operations disclosed in FIGS. 3A-3B (such as any one or more of S101, S102, S106, S107, S108A, S108B, S108C, S108D, S109, S110). The operations of the network node 400 may be embodied in the form of executable logic routines (for example, lines of code, software programs, etc.) that are stored on a non-transitory computer readable medium (for example, memory circuitry 401) and are executed by processor circuitry 402.

Furthermore, the operations of the network node 400 may be considered a method that the network node 400 is configured to carry out. Also, while the described functions and operations may be implemented in software, such functionality may as well be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 5). Memory circuitry 401 is considered a non-transitory computer readable medium.

Memory circuitry 401 may be configured to store beam information, such as beam indices or beam groups, and/or channel state information in a part of the memory.

Figure 6:
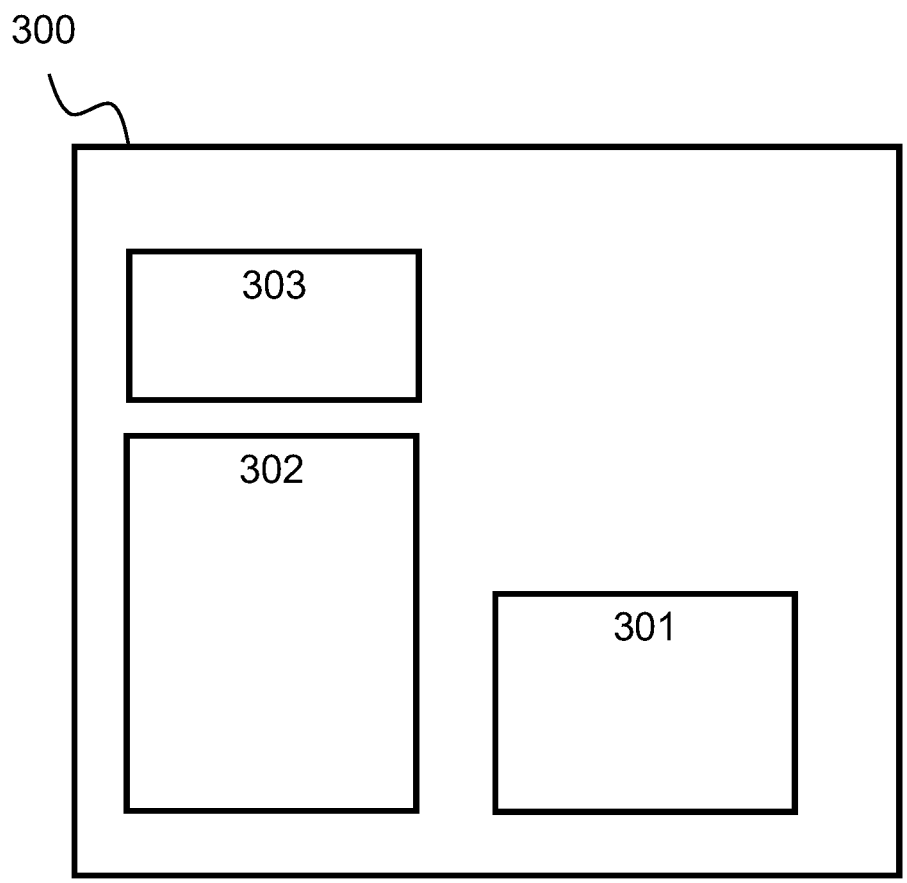
FIG. 6 is a block diagram illustrating an example wireless device according to this disclosure.

FIG. 6 shows a block diagram of an example wireless device 300 according to the disclosure. The wireless device 300 comprises memory circuitry 301, processor circuitry 302, and a wireless interface 303. The wireless device 300 may be configured to perform any of the methods disclosed in FIGS. 4A-4B. In other words, the wireless device 300 may be configured for beam suppression at the wireless device.

The wireless device 300 is configured to communicate with a network node, such as the network node disclosed herein, using a wireless communication system.

The wireless device 300 is configured to receive (such as via the wireless interface 303), from the network node, reference signals for channel estimation of a set of beams.

The wireless device 300 is configured to communicate (such as via the wireless interface 303), between the network node and the wireless device, control signaling indicative of beam suppression of at least one beam of a first subset of beams suppressible by the wireless device.

The wireless interface 303 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M.

The wireless device 300 is optionally configured to perform any of the operations disclosed in FIGS. 4A-4B (such as any one or more of S201, S202, S204, S206A, S206B, S206C, S206D, S208, S208A, S210). The operations of the wireless device 300 may be embodied in the form of executable logic routines (for example, lines of code, software programs, etc.) that are stored on a non-transitory computer readable medium (for example, memory circuitry 301) and are executed by processor circuitry 302.

Furthermore, the operations of the wireless device 300 may be considered a method that the wireless device 300 is configured to carry out. Also, while the described functions and operations may be implemented in software, such functionality may as well be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 6). Memory circuitry 301 is considered a non-transitory computer readable medium.

Memory circuitry 301 may be configured to store information beam information, such as beam indices or beam groups, and/or channel state information in a part of the memory.

Figure 7:
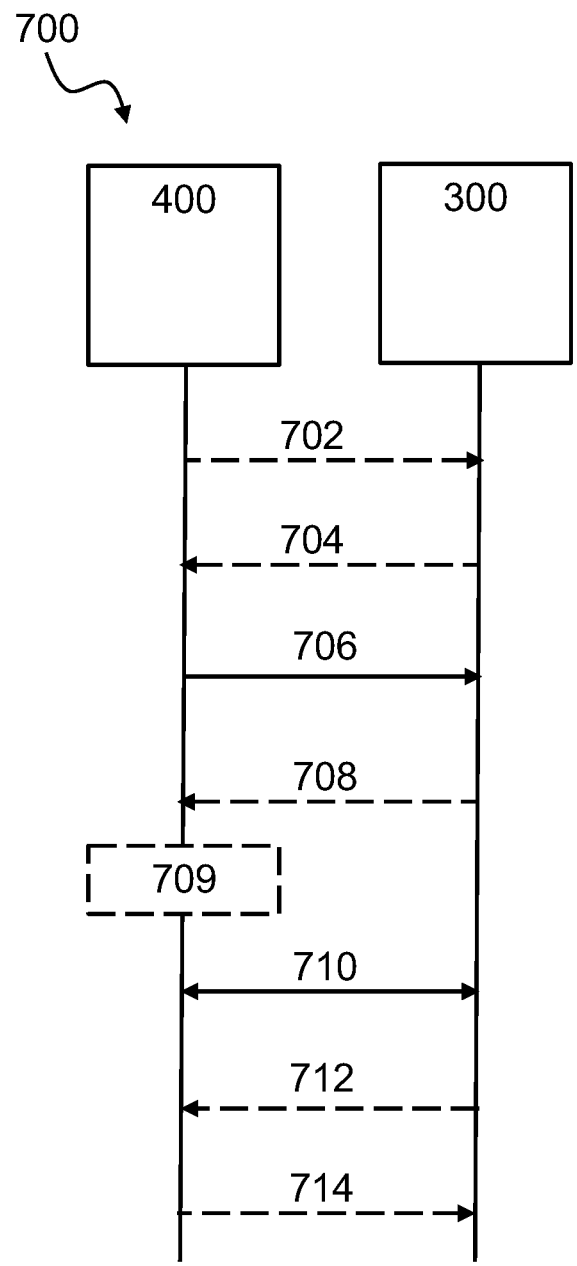
FIG. 7 is a signaling diagram illustrating an exemplary message exchange between an example network node and an example wireless device, for beam suppression at a wireless device, according to this disclosure.

FIG. 7 is a signaling diagram 700 illustrating an exemplary message exchange between an exemplary network node 400 and an exemplary wireless device 300, for beam suppression at the wireless device.

The network node 400 may transmit, to the wireless device 300, an indication 702 of a number of beams out of the set of beams for channel state reports from the wireless device. The indication indicates how many beams, such as CSI-RS beams, the wireless device shall send channel state reports on. This corresponds to S101 of FIG. 3A for the network node and S201 of FIG. 4A for the wireless device.

The wireless device 300 may transmit, to the network node 400, control signaling 704 indicative of a beam suppression capability of the wireless device. This corresponds to S102 of FIG. 3A for the network node and S202 of FIG. 4A for the wireless device.

The network node 400 transmits, to the wireless device 300, reference signals 706, such as CSI-RS, for channel estimation of a set of beams. Based on the reference signals the wireless device determines a second set of beams, such as a set of strong beams, to be used for communication with the network node 400. It may be appreciated that at this stage the wireless device 300 does not apply beam suppression disclosed herein and measures CSI-RS over the set of beams, such as over all of the beams comprised in the set of beams. This corresponds to S104 of FIG. 3A for the network node and S203 of FIG. 4A for the wireless device.

The wireless device 300 may transmit, to the network node 400, a channel state report 708 indicative of a second subset of the set of beams. The second subset may comprise a number of strong beams, such as the beams showing the highest channel quality parameter, based on measurements performed by the wireless device on the reference signals 706 transmitted. This corresponds to S106 of FIG. 3A for the network node and S204 of FIG. 4A for the wireless device.

The network node 400 may determine 709 a first subset of beams based on a quality parameter of the beams, such as of the beams of the second subset of beams, indicated in the channel state report 708 received from the wireless device. The first subset of beams are beams that are suppressible by the wireless device 300. This corresponds to S107 of FIG. 3A for the network node.

The network node 400 and the wireless device 300 communicate control signaling 710 indicative of beam suppression of at least one beam of the first subset of beams suppressible by the wireless device 300. This corresponds to S108 of FIG. 3B for the network node and S206 of FIG. 4A for the wireless device.

The wireless device 300 applies beam suppression based on the first subset of beams and transmits, to the network node 400, a channel state report 712 indicative of one or more remaining beams (excluding beams that are suppressed based on the first subset of beams). This corresponds to S109 of FIG. 3B for the network node and S208B of FIG. 4B for the wireless device. The channel state report 712 are reduced in number compared to channel state reports of 708, thereby enhancing the channel state reporting.

The network node 400 transmits, to the wireless device 300, control signaling 714 indicative of a resource for pilot signals for beam-suppression management on the first subset of beams. This corresponds to S110 of FIG. 3B for the network node and S210 of FIG. 4B for the wireless device.

Examples of methods and products (network node and wireless device) according to the disclosure are set out in the following items:

Item 1. A method, performed by a network node, for beam suppression at a wireless device, wherein the wireless device is configured to communicate with the network node, the method comprising:
  transmitting (S104), to the wireless device, reference signals for channel estimation of a set of beams; and
  communicating (S108), between the network node and the wireless device, control signaling indicative of beam suppression of at least one beam of a first subset of beams suppressible by the wireless device.

Item 2. The method according to Item 1, wherein communicating (S108) comprises:
  transmitting (S108A), to the wireless device, an indication that beam suppression is to be applied by the wireless device to at least one beam of the first subset.

Item 3. The method according to Item 1, wherein communicating (S108) comprises:
  transmitting (S108C), to the wireless device, an indication that the network node does not support assisting the beam suppression at the wireless device.

Item 4. The method according to any one of the Items 1 to 4, wherein the method comprises receiving (S106), from the wireless device, a channel state report indicative of a second subset of the set of beams.

Item 5. The method according to Item 4, wherein the first subset is a subset of the second subset of beams.

Item 6. The method according to any one of the Items 1 to 5, wherein the method comprises transmitting (S110), to the wireless device, control signaling indicative of a resource for pilot signals for beam-suppression management on the first subset of beams.

Item 7. The method according to Item 6, wherein the pilot signals are precoded according to one or more precoding filters for one or more other wireless devices or non-precoded.

Item 8. The method according to any one of the previous Items, wherein communicating (S108) comprises:
  transmitting (S108B), to the wireless device, an indication of at least one beam index of the first subset of beams that are to be suppressed by the wireless device.

Item 9. The method according to any one of the previous Items, wherein the method comprises:
  determining (S107) the first subset of beams based on a quality parameter of the beams indicated in the channel state report.

Item 10. The method according to any one of the previous Items, wherein the method comprises:
  receiving (S102), from the wireless device, control signaling indicative of a beam suppression capability of the wireless device.

Item 11. The method according to Item 10, wherein the beam suppression capability comprises an indication of a number of beams of the second subset of beams that the wireless device is capable of suppressing.

Item 12. The method according to any one of the previous Items, wherein the method comprises:
  transmitting (S101), to the wireless device, an indication of a number of beams out of the set of beams for channel state reports from the wireless device.

Item 13. A method, performed by a wireless device, for beam suppression at the wireless device, wherein the wireless device is configured to communicate with a network node, the method comprising:
  receiving (S203), from the network node, reference signals for channel estimation of a set of beams; and
  communicating (S206), between the network node and the wireless device, control signaling indicative of beam suppression of at least one beam of a first subset of beams suppressible by the wireless device.

Item 14. The method according to Item 13, wherein the method comprises:
  transmitting (S204), to the network node, a channel state report indicative of a second subset of the set of beams.

Item 15. The method according to Item 14, wherein the first subset is a subset of the second subset of beams.

Item 16. The method according to any one of the Items 13 to 15, wherein the method comprises:
  applying (S208) beam suppression for subsequent channel state reports based on the control signaling.

Item 17. The method according to any one of the Items 13 to 16, wherein the method comprises:
  transmitting (S202), to the network node, control signaling indicative of a beam suppression capability of the wireless device.

Item 18. The method according to Item 17, wherein the beam suppression capability comprises an indication of a number of beams of the second subset of beams that the wireless device is capable of suppressing.

Item 19. The method according to any one of the Items 13 to 18, wherein communicating (S206) comprises:
  receiving (S206A), from the network node, an indication that beam suppression is to be applied by the wireless device to at least one beam of the first subset.

Item 20. The method according any one of the Items 13 to 19, wherein communicating (S206) comprises:
  receiving (S206B), from the network node, an indication that the network node does not assist beam suppression.

Item 21. The method according to any one of the Items 13 to 20, wherein communicating (S206) comprises:
  receiving (S206C), from the network node, an indication of at least one beam index of the first subset of beams that are to be suppressed by the wireless device.

Item 22. The method according to any one of the Items 13 to 21, wherein the method comprises:
  receiving (S210), from the network node, control signaling indicative of a resource for pilot signals for beam-suppression management on the first subset of beams.

Item 23. The method according to any one of the Items 13 to 22, wherein the pilot signals are precoded according to one or more precoding filters for one or more other wireless devices or non-precoded.

Item 24. The method according to any one of the Items 13 to 23, wherein the method comprises:
  receiving (S201), from the network node, an indication of a number of beams out of the set of beams for channel state reports from the wireless device.

Item 25. A network node comprising a memory circuitry, a processor circuitry, and a wireless interface, wherein the network node is configured to perform any of the methods according to any of Items 1-12.

Item 26. A wireless device comprising a memory circuitry, a processor circuitry, and a wireless interface, wherein the wireless device is configured to perform any of the methods according to any of Items 13-24.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-7 comprises some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a network node, for beam interference mitigation at a wireless device configured to communicate with the network node, the method comprising:
    transmitting, to the wireless device, reference signals for channel estimation of a set of beams;
    transmitting control signaling to the wireless device, wherein the transmitted control signaling is indicative of beam suppression of at least one beam of a first subset of beams suppressible by the wireless device, the beam suppression attenuating interference of the at least one beam; and
    transmitting, to the wireless device, an indication that the network node does not support assisting the beam suppression at the wireless device.

2. The method according to claim 1, wherein the transmitting the control signaling comprises:
    transmitting, to the wireless device, an indication that beam suppression is to be applied by the wireless device to at least one beam of the first subset.

3. The method according to claim 1, further comprising receiving, from the wireless device, a channel state report indicative of a second subset of the set of beams.

4. The method according to claim 3, wherein the first subset is a subset of the second subset of beams.

5. The method according to claim 1, further comprising transmitting, to the wireless device, control signaling indicative of a resource for pilot signals for beam-suppression management on the first subset of beams.

6. The method according to claim 5, wherein the pilot signals are precoded according to one or more precoding filters for one or more other wireless devices or nonprecoded.

7. The method according to claim 1, wherein the transmitting the control signaling comprises:
    transmitting, to the wireless device, an indication of at least one beam index of the first subset of beams that are to be suppressed by the wireless device.

8. The method according to claim 1, further comprising:
    determining the first subset of beams based on a quality parameter of the beams indicated in a channel state report indicative of a second subset of the set of beams.

9. The method according to claim 1, further comprising:
    receiving, from the wireless device, control signaling indicative of a beam suppression capability of the wireless device.

10. The method according to claim 9, wherein the beam suppression capability comprises an indication of a number of beams of a second subset of beams that the wireless device is capable of suppressing, wherein the first subset is a subset of the second subset of beams.

11. The method according to claim 1, further comprising:
    transmitting, to the wireless device, an indication of a number of beams out of the set of beams for channel state reports from the wireless device.

12. A method, performed by a wireless device, for beam interference mitigation at the wireless device configured to communicate with a network node, the method comprising:
    receiving, from the network node, reference signals for channel estimation of a set of beams;

receiving, from the network node, control signaling indicative of beam suppression of at least one beam of a first subset of beams suppressible by the wireless device, the beam suppression attenuating interference of the at least one beam; and receiving, from the network node, an indication that the network node does not assist beam suppression.

13. The method according to claim 12, further comprising:

transmitting, to the network node, a channel state report indicative of a second subset of the set of beams.

14. The method according to claim 13, wherein the first subset is a subset of the second subset of beams.

15. The method according to claim 12, further comprising:

applying beam suppression for subsequent channel state reports based on the control signaling.

16. The method according to claim 12, further comprising:

transmitting, to the network node, control signaling indicative of a beam suppression capability of the wireless device.

17. The method according to claim 16, wherein the beam suppression capability comprises an indication of a number of beams of a second subset of beams that the wireless device is capable of suppressing, wherein the first subset is a subset of the second subset of beams.

18. The method according to claim 12, wherein the receiving the control signaling comprises:

receiving, from the network node, an indication that beam suppression is to be applied by the wireless device to at least one beam of the first subset.

\* \* \* \* \*